United States Patent [19]

Pachynski, Jr.

[11] 3,995,120

[45] Nov. 30, 1976

[54] DIGITAL TIME-DIVISION MULTIPLEXING SYSTEM

[75] Inventor: Alvin L. Pachynski, Jr., Redwood City, Calif.

[73] Assignee: GTE Automatic Electric Laboratories Incorporated, Northlake, Ill.

[22] Filed: May 30, 1975

[21] Appl. No.: 582,321

[52] U.S. Cl. .......................... 179/15 AF; 179/15 BS
[51] Int. Cl.² ........................................... H04J 3/06
[58] Field of Search.......... 179/15 AF, 15 BS, 15 A, 179/15 BA; 178/69.5 R

[56] References Cited
UNITED STATES PATENTS 3,564,414    2/1971    Ebert.............................. 179/15 AF

FOREIGN PATENTS OR APPLICATIONS 1,140,685    1/1969    United Kingdom ............ 179/15 AF

*Primary Examiner*—David L. Stewart
*Attorney, Agent, or Firm*—Douglas M. Gilbert; Leonard R. Cool

[57] ABSTRACT

A time-division multiplexing system wherein N parallel digital signals having an average bit rate of $f_1$ are interleaved by a multiplexer to form a single composite line signal of bit rate $f_2$, where $f_2 > NF_1$. Prior to multiplexing, signal gaps having a predetermined duration and having a fixed repetition rate are inserted into each of the N parallel signals. Adding gaps to each digital signal permits the bit rate between gaps to be increased to $f_2/N$, a submultiple of the composite line signal bit rate. The gap duration and their occurrence is such so as to maintain the average bit rate of each digital signal at $f_1$. Each digital signal with the added gaps is then interleaved to form the composite line signal having the desired bit rate of $f_2$. The interleaved gaps form empty time slots in the composite signal into which one or more signaling bits are added. Some of the added signaling bits carry framing information to enable the multiplexer and demultiplexer to maintain synchronism during signal transmission. Thus, a composite higher-rate digital line signal, consisting of interleaved information bits and signaling bits, forms the time-division multiplex signal suitable for transmission over a single digital transmission path. The N parallel digital signals are recovered at the demultiplexer by sequentially selecting each information bit associated with a particular digital signal.

13 Claims, 9 Drawing Figures

FIG. 3 TRANSMIT WAVEFORMS

"N" CHANNEL DEMULTIPLEXER

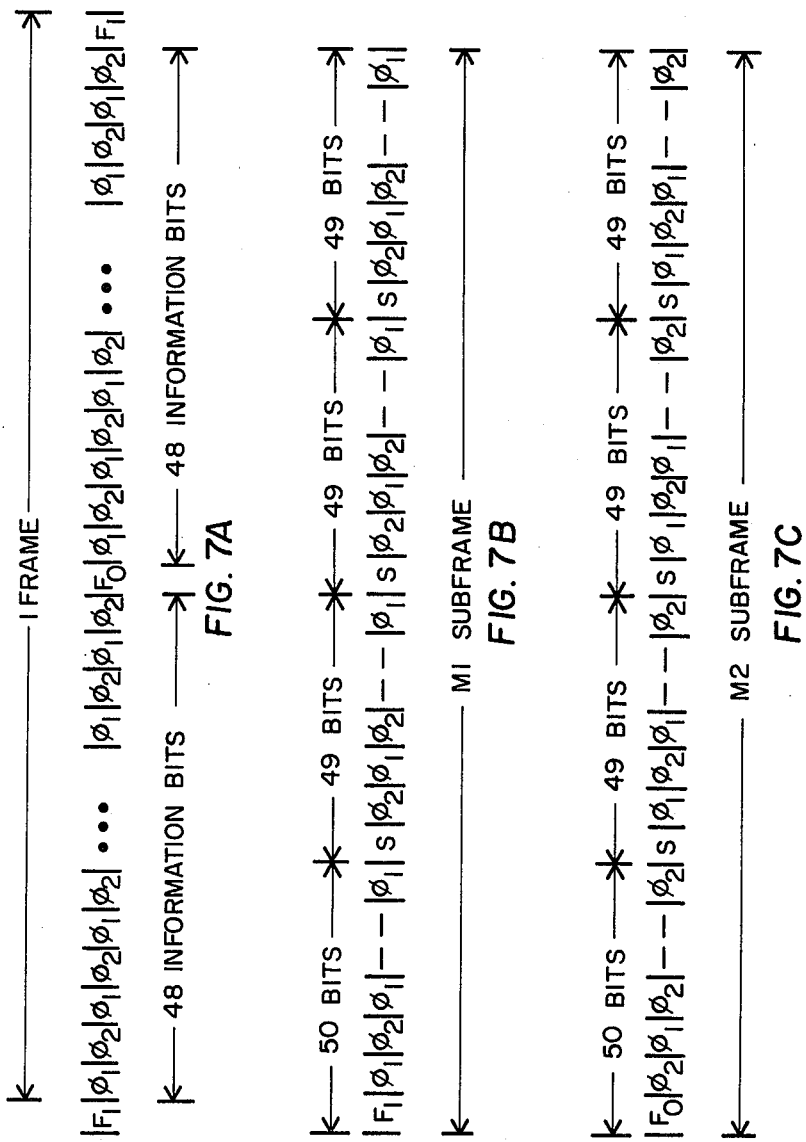

DIGITAL TIME-DIVISION MULTIPLEXING SYSTEM

FIELD OF THE INVENTION

This invention relates to digital telecommunication systems and more particularly to time-division multiplexing systems for a plurality of synchronous digital signals.

BACKGROUND OF THE INVENTION

Over the past several years, PCM (pulse-code modulation) cable carrier systems have seen tremendous growth in exchange trunk transmission. In some locations, multi-pair exchange cables have become fully utilized, necessitating the addition of more cables and more line repeaters. In this surrounding, digital multiplexers have been developed for combining the digital outputs of several PCM terminals into a single, higher-rate composite bit stream. See "Digital Multiplexers", *Transmission Systems for Communications*, Fourth Edition, Chapter 26, Bell Telephone Laboratories Inc., 1970.

The typical approach to time-division multiplexing of the digital signals from several PCM terminals, as explained in *Transmission Systems for Communications*, supra, is to consider the several bit streams as asynchronous digital signals. This technique provides maximum flexibility since it permits the digital signal sources to be separated by large distances, i.e., it does not require prior synchronization of the individual bit streams. If the multiplexer input signals are truly asynchronous, then elastic stores or equivalent must be used to periodically delay the incoming bit streams. Digital storage provided by elastic stores permits variable pulse stuffing to be used to increase the bit rates of all incoming signals to that of a local clock signal. Variable pulse stuffing, provided by elastic stores, permits maximum system flexibility since few constraints are placed on the PCM terminal output signals. For a full discussion of pulse stuffing, see V. I. Johannes and R. H. McCullough, "Multiplexing of Asynchronous Digital Signals Using Pulse Stuffing with Added Bit Signaling", *IEEE Transactions on Communication Technology*, October 1956, pp. 562 – 568; and U.S. Pat. No. 2,548,661.

Elastic stores and their control circuitry are unfortunately rather complex and expensive circuits, and their cost necessarily increases the overall system cost of a digital multiplexing system. Also, variable pulse stuffing requires an added information channel to inform the receive terminal of the location of the stuffed pulses. Although such information is usually sent on a time-share basis with the framing bits, it is still wasteful since it requires the transmission of added information useful only to the multiplexer.

In contrast, the invention described herein does not require the use of elastic stores in a digital multiplexing system of the type just described. Further, the system herein makes full use of its signaling channel since only framing bits need be sent to the receive terminal. Code words, used in previous systems to identify stuffed bits, need not be transmitted with the information bits. The only added restriction placed on the use of this multiplexing system is that the N sources of digital information be capable of being bit synchronized to the same external master clock signal before entering the digital multiplexer.

It is an object of this invention to provide a digital multiplexing system design technique capable of multiplexing the digital output signals of N digital sources, each having an average bit rate $f_1$, into a digital composite line signal having a bit rate $f_2$.

It is a further object of this invention to provide a digital demultiplexer not requiring elastic stores.

BRIEF SUMMARY OF THE INVENTION

My invention is a time-division multiplex system for multiplexing N parallel digital signals, each having an average bit rate of $f_1$, and forming a single composite digital line signal of rate $f_2$, where $f_2 > Nf_1$. In general, the system consists of a digital multiplexer (transmitter) and a digital demultiplexer (receiver). The multiplexer is arranged so that each digital source is under the control of a clock signal, $f_1'$, which is generated by a clock circuit in the multiplexer. The effective bit rate of each digital signal is increased by the $f_1'$ clock signal to $f_2/N$ so that the N bit streams can be directly interleaved at the $f_2$ rate. To maintain the average bit rate of each bit stream at $f_1$, gaps are periodically inserted in each bit stream by the $f_1'$ clock signal. By inserting these periodic gaps in all N signals at the same time and by proper alignment, the gaps will occur in the composite line signal providing a useful time slot for inserting framing and signaling information on a time-division multiplexed basis. The inserted framing bits permit the receiver to synchronize both the multiplexer and demultiplexer together.

At the demultiplexer, digital counters and reframing circuits search out the framing bit and generate a clock signal, $f_b$, which identifies the time interval in which the signaling/framing bits are located. From this signal, the multiplexing sequence can be determined to permit demultiplexing of the received composite line signal. Each bit is identified with a particular digital source at the multiplexer and is sequentially removed from the line signal. N bit streams are formed corresponding to the transmitted N bit streams. The last step in the demultiplexing process optionally reestablishes the $f_1$ clock signal timing to each bit stream.

BRIEF DESCRIPTION OF THE DRAWINGS

The above and other features of this invention will be considered in the following specification in connection with the accompanying drawings in which:

FIG. 7 including 7A through 7C illustrates typical framing patterns of the multiplexed line signals.

DETAILED DESCRIPTION

According to the principles of this invention, in a digital communication system comprised of N synchronous bit streams, each having an average bit rate $f_1$, multiplexed at a line rate of $f_2$, where $f_2 > Nf_1$, there is a third signal, $f_s$, which is useful in defining the relationship between N, $f_1$, and $f_2$ as follows: $f_2 = Nf_1 + f_s$. $f_s$ is termed the stuffing rate, since it defines the number of bits, or more precisely the number of time slots (per unit of time) that must be added to N bit streams to permit time-division multiplexing of all N bit streams at a line bit rate of $f_2$. Thus, $f_s = f_2 - Nf_1$. In asynchronous multiplexing systems using elastic stores, $f_1$ and $f_s$ are variables. In the invention herein, $f_s$ and $f_1$ are fixed by system design.

Figure 1:
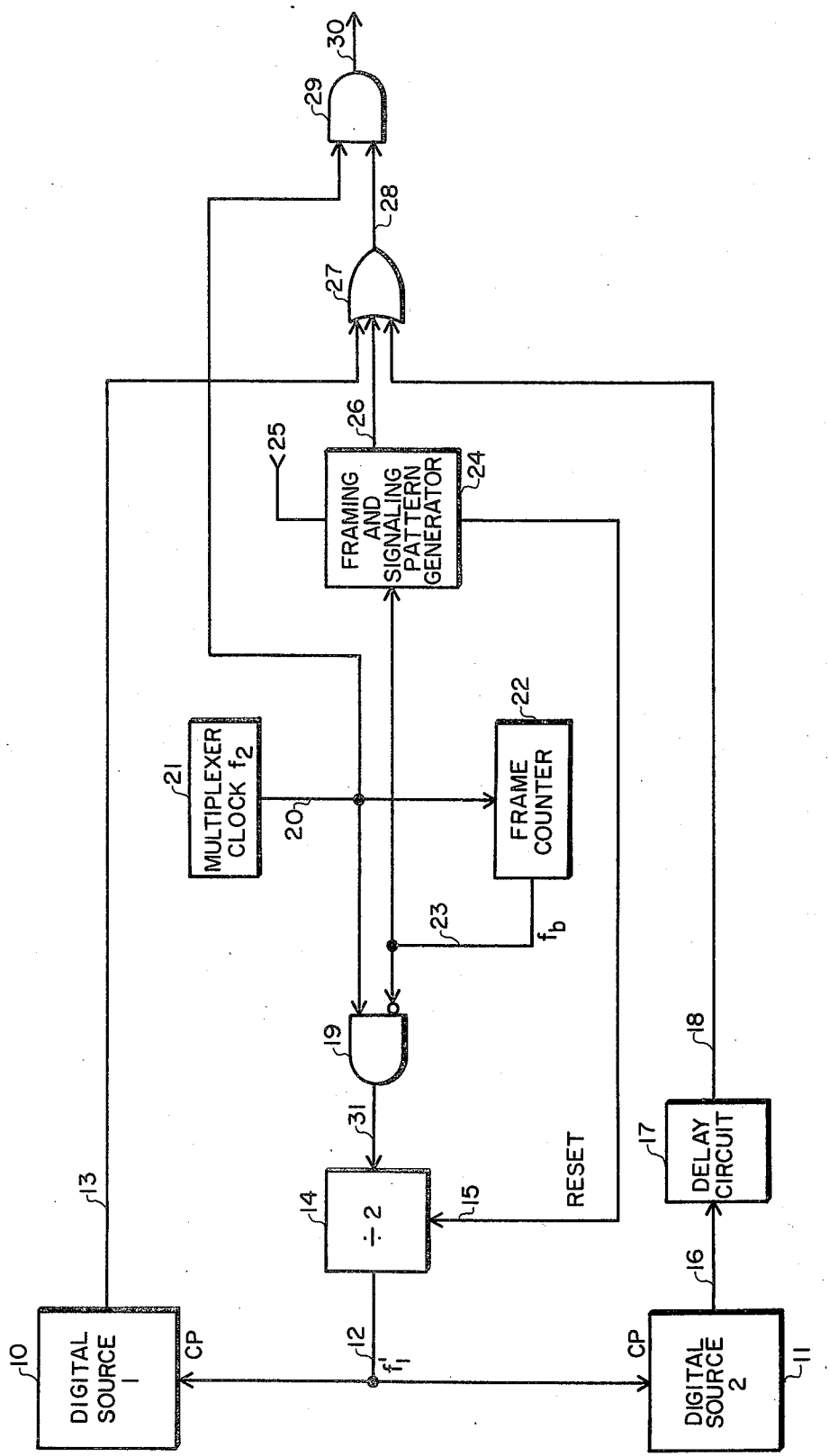
FIG. 1 is a block diagram of one embodiment of a two-channel digital multiplexer in a digital multiplexing system in accordance with the principles of this invention.
Figure 3:
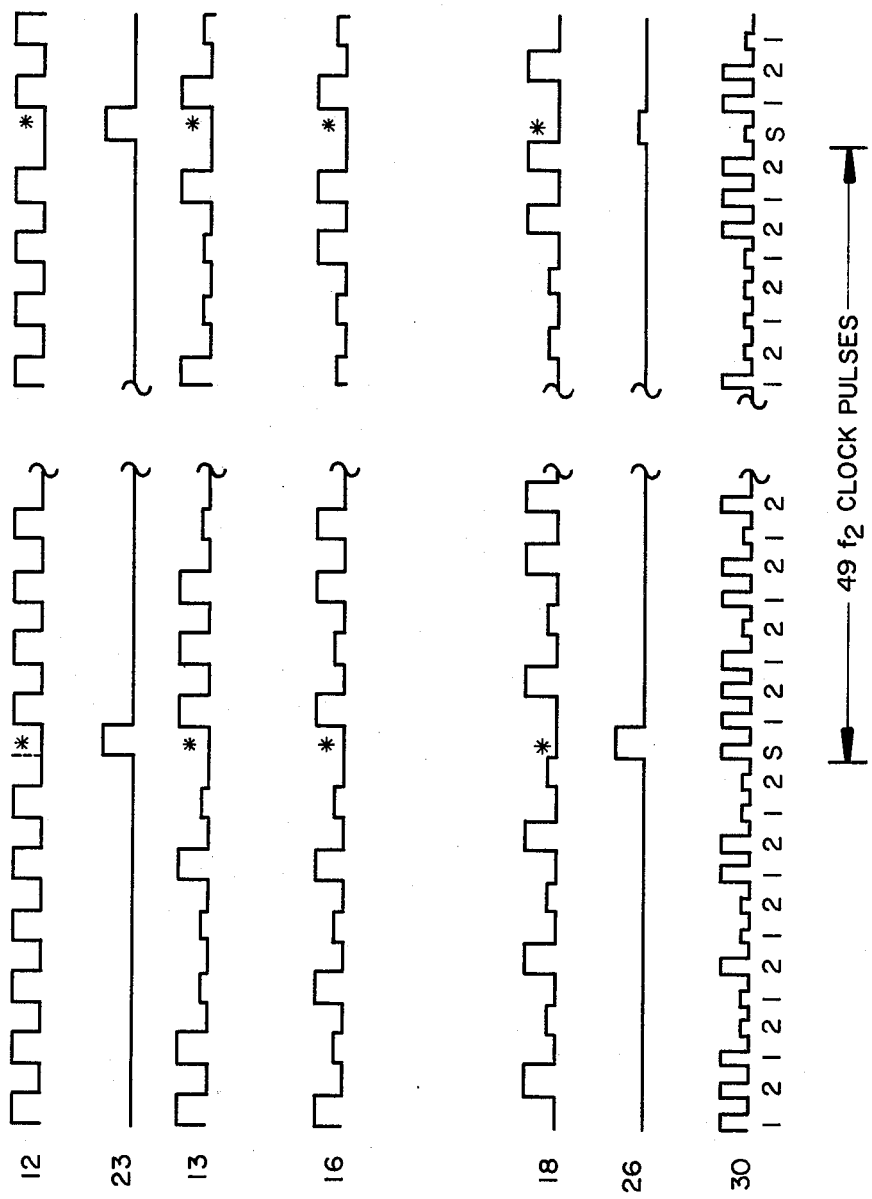
FIG. 3 illustrates the waveforms associated with the multiplexer shown in FIG. 1.
Figure 4:
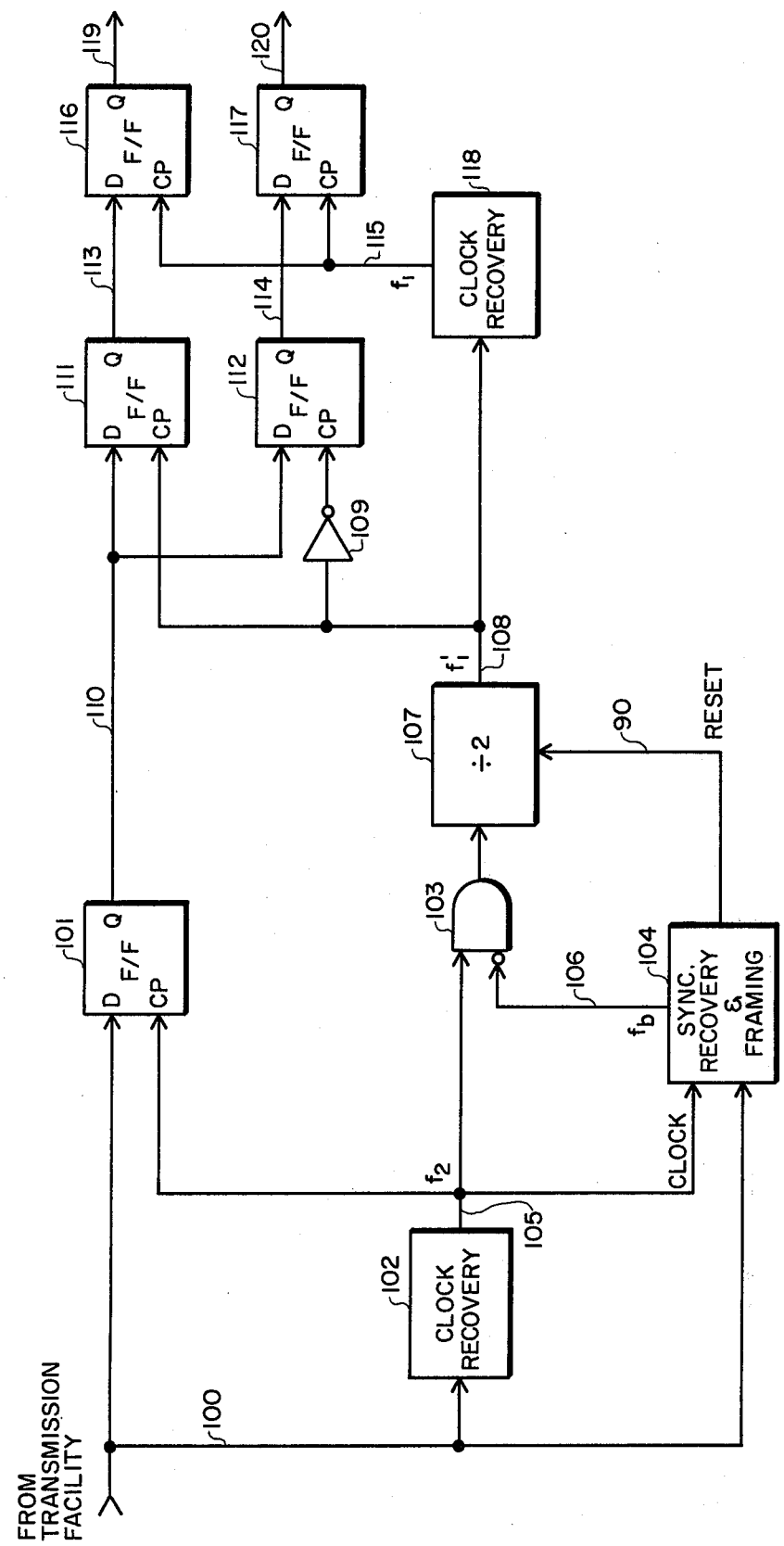
FIG. 4 is a block diagram of one embodiment of a digital demultiplexer in a digital multiplexing system, coordinating with the multiplexer shown in FIG. 1.

A two-channel digital multiplexer in accordance with this invention is shown in FIG. 1 with its associated waveforms shown in FIG. 3. This equipment constitutes the transmitter portion of a digital communication facility. (FIG. 4 illustrates the coordinating demultiplexer equipment). The transmission link connecting the multiplexer and demultiplexer together may comprise a wire line, a cable, or a microwave radio facility. In FIG. 1, digital sources 10 and 11 are furnished by the user of the multiplexing system. For example, such digital sources could comprise the transmit portion of two PCM terminals. Digital sources 10 and 11 are shown to generate digital RZ (return-to-zero) signals on paths 13 and 16 and as illustrated by waveforms 13 and 16 in FIG. 3. Although some digital sources may provide NRZ (nonreturn-to-zero) signals, the RZ condition has been assumed in FIGS. 1 and 3 since it is a more general condition.

In FIG. 1, the outputs of the two digital sources are shown as digital output signals on paths 13 and 16. The clock signal on lead 12, $f_1'$, causes the output signals of the two digital sources to be bit synchronized, i.e., it establishes the output bit rates of each source to be the same as that of the $f_1'$ clock. The clock signal is generated by the clock circuitry consisting of multiplexer clock generator 21; frame counter 22; AND-gate 19; and digital divider circuit 14. The multiplexer clock signal $f_2$ on path 20 is generated by a stable digital clock generator 21. This multiplexer clock signal is applied to AND-gates 19 and 29 as shown in FIG. 1. Also appearing at an inverted input to AND-gate 19 is the binary signal $f_b$ from frame counter 22. Although designated as a frame counter, 22 generates a pulse, $f_b$, after a predetermined number of $f_2$ clock pulses not necessarily coincident with a frame of the composite line signal at 30. This signal is called the blanking signal since it has the effect of creating a blanking interval (or gap) in the $f_2$ clock signal due to the operation of AND-gate 19. Since the $f_b$ input to AND-gate 19 is inverted ($\overline{f_b}$), the output of AND-gate 19 is inhibited during the interval when frame counter 22 generates the blanking signal $f_b$. If the pulse width of $f_b$ is a minimum of $\tau_2$ seconds, where $\tau_2 = 1/f_2$, then the signal bit rate on path 31 may be represented by the expression $f_2 - f_b$ or the Boolean expression $f_2 \cdot \overline{f_b}$. Stated somewhat differently, one pulse in the $f_2$ waveform is periodically removed as a result of the operation of AND-gate 19 and $f_b$. The $f_b$ signal on path 23 in FIG. 1 is shown in FIG. 3 as waveform 23 and has a pulse width of $\tau_2$. The pulse width of $f_b$ may, in general, be made longer than $\tau_2$. If the pulse width is increased by $k$ multiples of $\tau_2$, $k$ consecutive bits would be removed from the multiplex clock signal $f_2$ at AND-gate 19. The signal on path 31 may then be represented in general by the expression $f_2 - kf_b$, where $k$ represents the number of consecutive bits periodically removed from the $f_2$ bit stream. As indicated by the waveforms in FIG. 3, $k = 1$ since $f_b$ has a pulse width of $\tau_2$ seconds.

The output of AND-gate 19, path 31, is applied to a digital divider circuit 14. This divide-by-two circuit performs a digital division upon the input signal and generates the $f_1'$ clock signal on path 12. The average bit rate of $f_1'$ is $f_1$ and is also equal to the expression ($f_2 - kf_b)/2$, as a result of the operation of circuits 21, 22, 19, and 14. The blanking interval occurs as shown in waveform 12 in FIG. 3 as indicated by the asterisks. Since this clock signal controls the output bit rate of digital sources 1 and 2, the output bit streams on paths 13 and 16 also have the same blanking interval as shown in FIG. 3 (asterisks indicate the blanking intervals).

The bit streams on paths 13 and 16 can now be readily interleaved to form a single composite line signal since the bit rate of each signal is a submultiple of the composite line signal, namely $f_2/2$. Digital delay circuit 17 in FIG. 1 delays the output signal with respect to the input signal by ½cycle. A shift register could be used for this application. Waveform 18 in FIG. 3 indicates the relative phase shift between the two signals. The amount of delay in 17 is established so that the two bit streams on 13 and 18 are 180° out of phase with each other at the input to OR-gate 27. This permits the OR-gate to directly interleave the two bit streams together. using the OR-gate and delay circuit in this manner is very useful since control signals are not required to clock the interleaving of the two bit streams. The combined signal on path 28 is an NRZ digital signal having a bit rate of $f_2$. AND-gate 29 converts the NRZ signal to the RZ digital waveform shown in FIG. 3 by waveform 30. When the two bit streams are combined by OR-gate 27, the alignment of the blanking intervals in each signal is such that a gap, $\tau_2$ seconds in duration, ($k\tau_2$ seconds in general) occurs in the output along with the interleaved information bits. Since this time interval is free of information bits, it can be used effectively for the insertion of either framing or signaling information. This may be done by inserting the added bits at OR-gate 27 via connection 26.

Before discussing the operation of the framing and signaling pattern generator 24, it is useful to define the stuffing ratio $S_R$ which is defined as $$S_R = \frac{Nf_1}{f_s} = \frac{Nf_1}{f_2 - Nf_1} = \frac{\text{Number of information time slots}}{\text{Number of stuffed time slots}}$$

In this invention, for every ($Nf_1$) multiplexed time slots there are $f_s$ or ($f_2 - Nf_1$) fixed time slots inserted into the composite multiplex signal. In the frame format of line A in FIG. 7, for every 48 multiplexed time slots there is one time slot added to the composite signal, and therefore the stuffing ratio, $S_R$, equals 48. The framing and signaling pattern generator 24 generates the particular framing pattern desired for synchronization of the demultiplexer with the multiplexer. There is a variety of framing patterns which can be used for this application. The framing pattern shown in line A of FIG. 7 is a simple one-zero pattern, commonly called a winking pattern. The $F_1$ and $F_0$ designations indicate framing bits having this 1-0 alternation pattern. The $\phi_1$ and $\phi_2$ indicate the multiplexed information bits. Waveform 26 in FIG. 3 produces this alternating framing pattern in the embodiment of FIG. 1

Signaling information can also be inserted during the blanking interval in the multiplexed signal along with the framing bits on a time-share basis: In lines B and C of FIG. 7, signaling bits (S) occupy three out of every four time slots available for framing or signaling information. Lines B and C in FIG. 7 also indicate a more complex framing pattern. The stuffing ratio, $S_R$, for one frame consisting of both the M1 and M2 subframes, is 48.25. In a two-channel system in which $f_1$ equals 1.544 Mb/s and $f_2$ equals 3.152 Mb/s, a stuffing ratio of 48.25 would be required (2) (1.544)/3.152 - (2)(1.544). There are a number of different ways such a stuffing ratio could be properly implemented and framed, and lines B and C merely illustrate one particular example. The framing and signaling pattern generator, however, would necessarily increase in complexity as the complexity of the framing pattern increased. Refer to *Transmission Systems for Communications*, Third Edition, Bell Telephone Laboratories, Inc., 1965, p. 640 – 644 for further information on typical framing pattern generators.

Generator 24 also resets divider 14 via path 15. This reset connection is required to insure that digital counter 14 is in a zero state at the beginning of each frame (see line A, FIG. 7). Without this connection, the $f_1'$ clock signal would be in an indeterminate state after each blanking interval. In the frame format shown by lines B and C in FIG. 7, the reset signal on 15 further insures that the $f_1'$ clock signal during the blanking interval is in a zero state.

Figure 2:
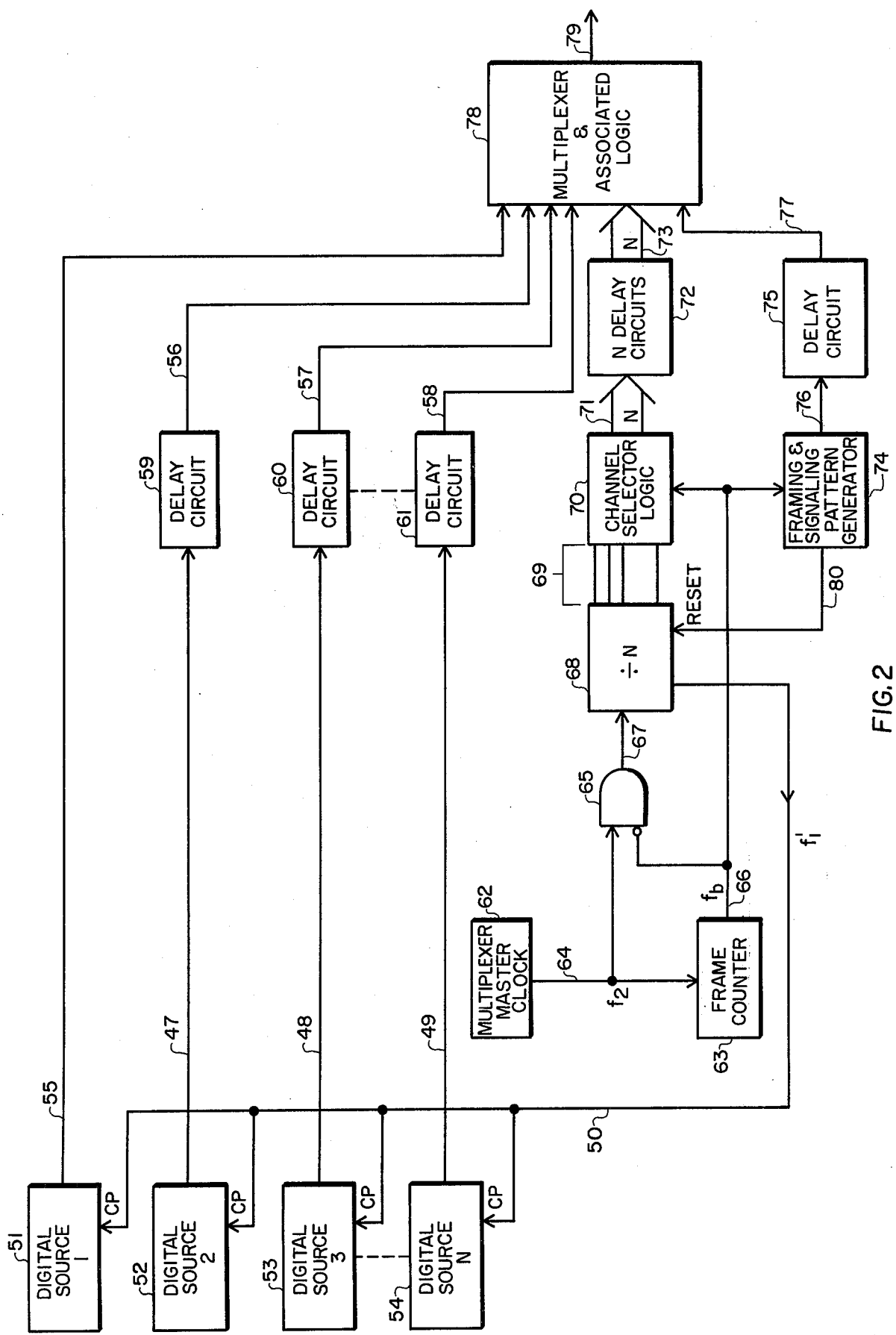
FIG. 2 is a block diagram of an N channel digital multiplexer in a digital multiplexing system in accordance with the principles of this invention.
Figure 5:
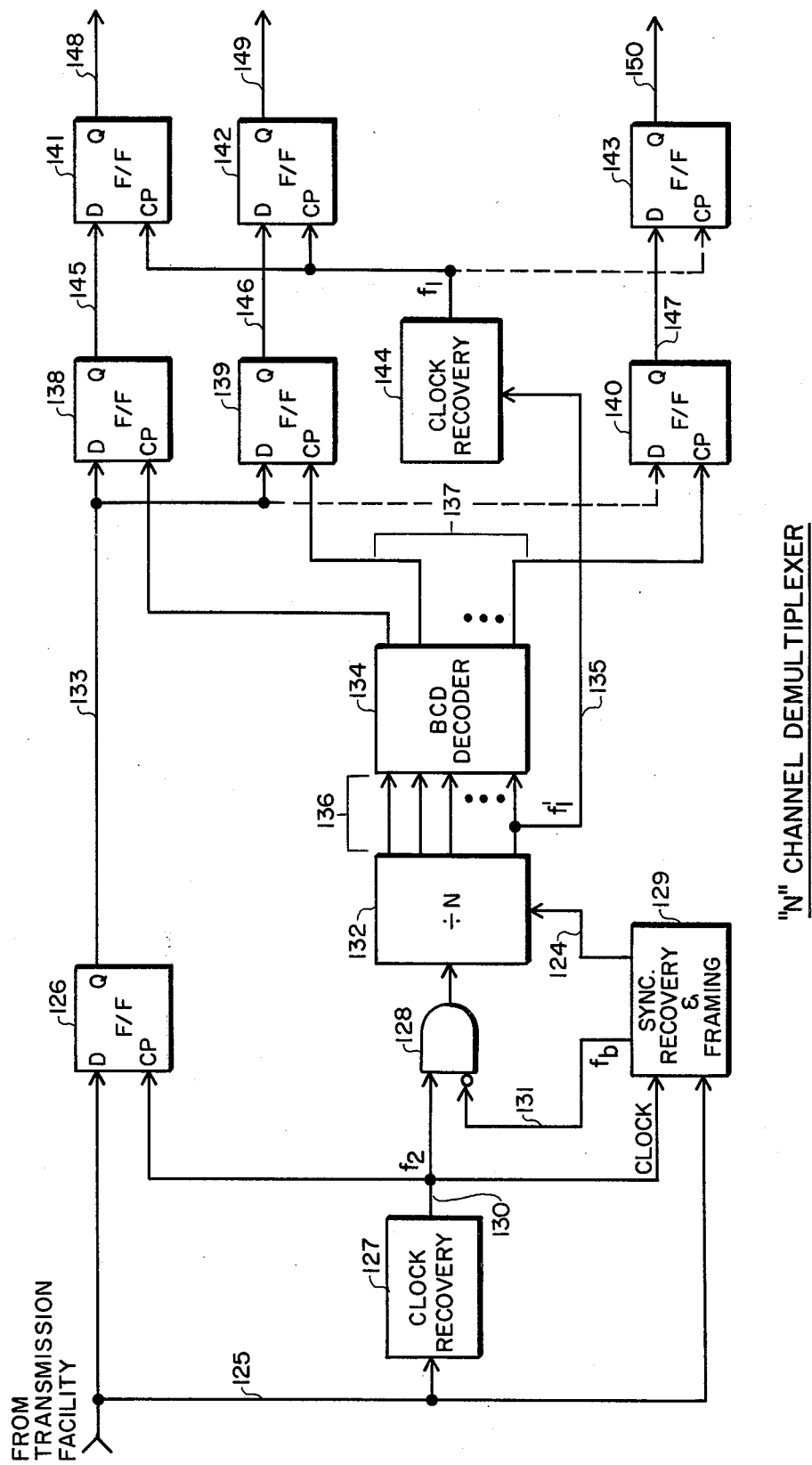
FIG. 5 is a block diagram of an N channel digital demultiplexer in a digital multiplexing system.

FIG. 2 discloses a digital multiplexer capable of combining N bit streams using the same principles described in conjunction with the embodiment shown in FIG. 1. (FIG. 5 illustrates the coordinating demultiplex equipment). Each digital source 51, 52, 53, and 54 generates an RZ bit stream on paths 47, 48, 49, and 50, respectively, each having an average bit rate of $f_1$. As in FIG. 1, an external clock signal $f_1'$ is applied on path 50 to the N digital sources at the CP inputs. Basically, the same clock circuitry described before is used here to generate the $f_1'$ clock signal on lead 50. The multiplexer clock generator 62, the frame counter 63, and AND-gate 65 operate in the same manner as was described in conjunction with FIG. 1 to produce a signal on path 67 which can be represented on the average as $f_2 - kf_b$. A digital divider circuit 68 performs a divide-by-N division on this signal producing the clock signal $f_1'$ equal to $(f_2 - kf_b)/N$. Digital divider 68 also generates a plurality of binary signals at 69 which are applied to the channel selector logic 70. The binary signals on leads 69 are used by the channel selector logic 70 to generate the timing signals needed by the multiplexer 78 to perform the multiplexing of all N bit streams.

The delay circuits shown as 59, 60, 61, 72, and 75 are required to compensate for the various system delays when such delays are an important consideration. Certainly there would be situations in which these delay circuits would not have to be used. In low-speed digital systems or systems that are relatively insensitive to what is called a phasing error, these delay circuits would not be required. Delay circuits 59, 60, and 61 compensate for the difference of delays of the $f_1'$ clock signal from divider 68 to the various N digital sources and for the various delays from the digital sources to the multiplexer circuit 78. Path 55 is shown with no delay circuit since it is assumed that this path is the "longest" path, i.e., it has the most delay from the digital divider circuit 68 to the input of the multiplexer circuit 78. The delay of each delay circuit is established so that at the input to the multiplexer circuit 78, the gaps in each bit stream occur at the same point in time. This alignment of the blanking interval is necessary if it is to be used for the insertion of added information such as framing or signaling information.

The N delay circuits 72 would be adjusted to equal the maximum delay of the various paths. The N sequential signals 71 must reach the multiplexer 78 via path 73 such that the various bit streams 55, 56, 57, and 58 are interleaved consecutively without any overlap or gaps occurring between the bits where none was intended. Delay circuit 75 serves a similar purpose for the framing and signaling pattern generator. The signaling bits and framing information which are inserted in the composite signal during the blanking interval must receive a like delay so that these added bits may be stuffed during the appropriate interval. The multiplexer circuit and its associated logic 78 actually performs the interleaving of the N bit streams and the added signaling and framing bits. Multiplexer circuits capable of performing this function are commercially available today in integrated form. The Texas Instruments Corporation, Dallas, Texas, manufactures a "Data Selector" capable of multiplexing N bit streams, (Ser. No. 74153, handles four input bit streams). This could be used in conjunction with an OR-gate to insert the framing bits.

The composite line signal appears on path 79 for transmission over a suitable digital facility to the receiver circuits. Reset connection 80 from generator 74 to digital divider circuit 68 serves the same basic function as the reset connection 15 in FIG. 1. Without this connection, counter 68 would be in an indeterminate state after each frame, causing an improper multiplexing sequence. The framing and signaling pattern generator can be constructed out of sequential and combinatorial logic elements, and this is certainly within the capabilities of a person having ordinary skill in the art. The particular circuits chosen to implement such a generator would depend upon various factors such as the number of bit streams, the stuffing ratio, $S_R$, the particular framing pattern chosen, and whether external signaling would be required.

The digital divider circuit 68 is sometimes called a fixedmodulo counter. (See *Digital Electronics for Scientists*, by H. V. Malmstadt et al, pp. 255 –262, W. A. Benjamin, Inc., New York, 1969). Typical circuit designs are given in *Logic Design with Integrated Circuits*, "Special Counters", by William E. Wickes, pp. 209 –223, John Wiley & Sons, Inc., New York, 1968. Using flip-flops as described therein, output connections 69 would represent the outputs from each flip-flop stage of a divide-by-N binary counter.

The channel selector logic 70 could easily be implemented using binary decoders or BCD-to-decimal decoders of a type manufactured by Texas Instruments Corporation, Dallas, Texas, Ser. No. 7400 series. There are any number of circuit techniques well known in the art which could be used to implement the multiplexer and logic circuit 78 capable of performing the required interleaving function. The implementation of frame counters 22 and 63 in FIGS. 1 and 2 is well within the capability of a person skilled in the art once the frame counter function is well understood. Frame counter 63 (or 22) generates an output binary signal, $f_b$, after a predetermined number of input $f_2$ bits. In the frame format 'A' shown in FIG. 7, the frame counter would generate a single bit, $1/f_2$ seconds in duration, after every 48 $f_2$ clock pulses generated by 62 in FIG. 2. In the frame format shown in B and C of FIG. 7, the frame counter would generate a single bit after a variable counting pattern, namely 49, 48, 48, 48, 49, 48, 48, 48 ... In an embodiment where consecutive $(f_R)$ bits are stuffed during the blanking interval, the pulse width of $f_b$ must be accordingly longer. Where $k = 2$, the pulse width of $f_b$ would be $2\tau_2$ seconds. Stuffing multiple framing bits may be desirable in some applications since the reframing time of the demodulator would be shortened.

Figure 6:
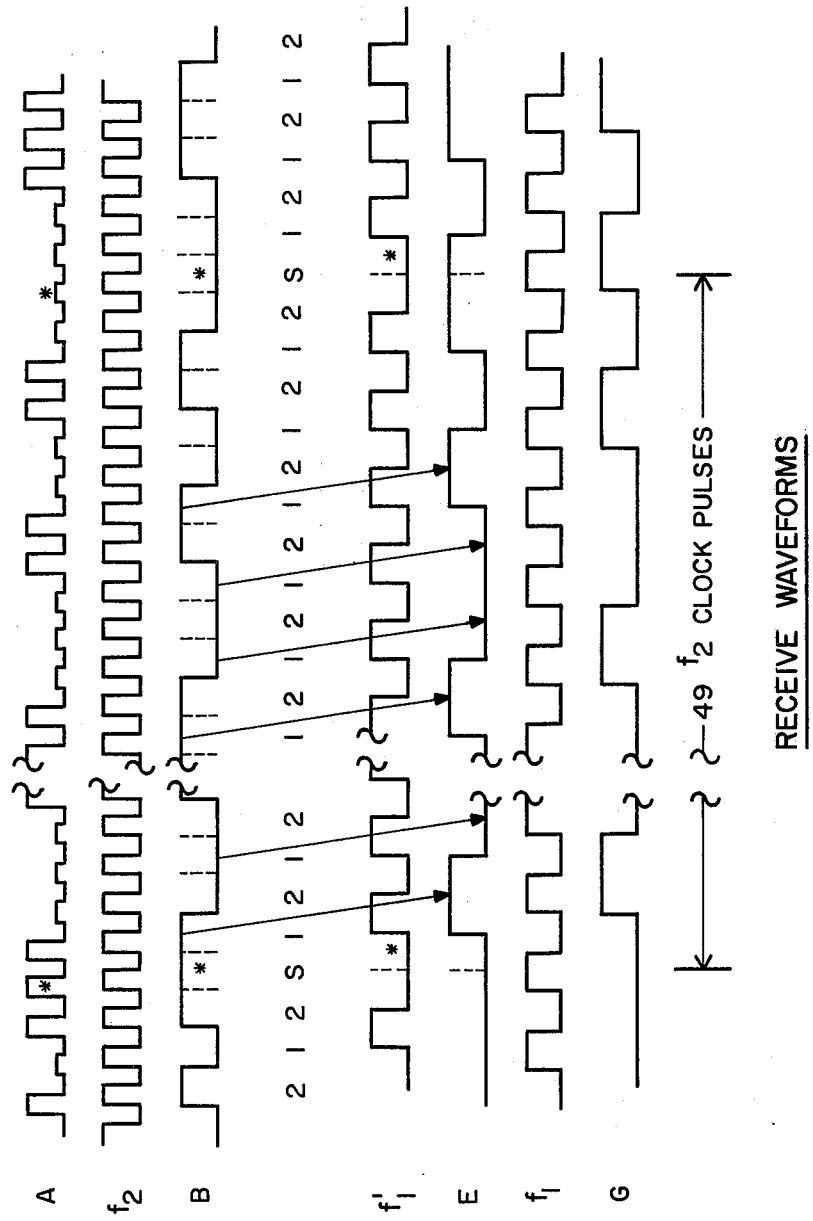
FIG. 6 illustrates the waveforms associated with the demultiplexer shown in FIG. 4.

A block diagram of a compatible two-channel demultiplexer is shown in FIG. 4, and the associated waveforms are shown in FIG. 6. After transmission over a suitable digital facility, the composite line signal enters the receiver as an RZ bit stream. This is shown as waveform A in FIG. 6. The $f_2$ line clock signal is shown as $f_2$ in FIG. 6. A standard clock recovery circuit 102 in FIG. 4 is used to recover the basic timing signal $f_2$. The clock signal $f_2$ must be recovered (or regenerated with a stable oscillator) for use in a sync recovery circuit 104 and for regenerating the timing signals required for demultiplexing the original multiplexed bit streams. In the signal path, the RZ signal is applied to the D-input of a D-type flip-flop 101. The $f_2$ clock signal 105 is connected to the CP input of flip-flop 101. Since this and all the flip-flops in FIGS. 4 and 5 are edge-triggering devices, flip-flop 101 converts the input RZ signal to an NRZ binary signal. This is shown as waveform B in FIG. 6, and the multiplexed line bit position assignment is shown below waveform B. The sync recovery and framing circuit 104 generates the blanking signal $f_b$. This is the same $f_b$ signal as was generated at the multiplexer shown in FIGS. 1 and 2. Sync recovery circuits (frame detectors) capable of generating this signal from the clock signal $f_2$ and the input signal 100 are well known in the art. If a low-speed bit stream were inserted during the blanking interval at the multiplexer (via 25 in FIG. 1), the sync recovery circuit 104 also would be used to demultiplex this signal.

A reset signal is applied to the counter 107 via connection 90. This signal assures that counter 107 is in the proper state at the beginning of each subframe or frame. Blanking signal $f_b$ is applied via path 106 to the inverting input of AND-gate 103. Thus, the clock signal $f_2$ appears at the output of AND-gate 103 but is inhibited during the blanking interval. The output of AND-gate 103 represents a signal whose average repetition rate is equal to $f_2 - kf_b$. On an instantaneous basis, this means that entry of every $49^{th}$ pulse into the divide-by-two circuit 107 is prevented by the inhibit signal $f_b$ (assuming the frame format is as shown in A, FIG. 7). Digital divider 107 reduces the input signal to one-half the repetition rate and thus forms the clock signal $f_1'$, which is the same clock signal used at the transmitter. Clock signal $f_1'$ via 108 is connected to flip-flop 111, and flip-flop 112 via inverter circuit 109. Appearing at the D-inputs of these two flip-flops is the NRZ signal 110. The $f_1'$ clock signal provides flip-flop 111 with the timing information to enable it to select the channel 1 bits from the composite NRZ signal 110. Thus, the output of this flip-flop on path 113 is an NRZ digital signal consisting of channel 1 bits occurring at the $f_2/2$ rate with the blanking interval still present (this is the $f_1'$ rate). This digital signal is shown by waveform E in FIG. 6. By inverting the clock signal $f_1'$ in inverter 109, flip-flop 112 is enabled to select out the channel 2 bits from the composite NRZ signal 110. Thus, the output on path 114 represents the NRZ channel 2 bit stream having a repetition rate of $f_2/2$ and having the blanking intervals still present. At 113 and 114, although the blanking interval is present, the framing and signaling bits have been removed by the flip-flops 111 and 112. Flip-flops 116 and 117 serve to retime these two bit streams to obtain two parallel signals having a new bit rate of $f_1$. These two information signals thus appear on paths 119 and 120. To perform this retiming function, a clock recovery circuit 118 supplies a new clock signal $f_1$ to flip-flops 116 and 117 on path 115.

FIG. 5 represents a similar demultiplexer having an N channel capacity and operating under the same principles described in reference to FIG. 4. The input RZ composite line signal on path 125 is retimed by the edge-triggered D-type flip-flop 126 to provide an NRZ composite signal on path 133. The clock recovery circuit 127 is used to generate the $f_2$ clock timing which is applied via 130 to the sync recovery and framing circuit 129. With the RZ composite line signal and the $f_2$ clock signal as inputs, the frame detector circuit 129 generates the blanking signal $f_b$ at its output. The blanking signal is again inverted at the input to AND-gate 128, which inhibits the $f_2$ clock signal at the output of the AND-gate. This signal is applied to digital divider circuit 132, which is similar to the divider circuit shown in FIG. 2 as 68. A reset signal applied on 124 assures that the divide-by-N counter is in the proper state prior to each frame or subframe. The binary outputs on leads 136 are applied to the BCD decoder 134 which generates the proper clock signals, on 137, for use in demultiplexing the composite line signal on 133. The N D-type flip-flops 138, 139, and 140 effect a time-division demultiplexing of this NRZ signal by selecting out the proper bits associated with their particular time slot allocation. Thus, the output signals at 145, 146, and 147 represent the channel 1 and channel 2 through channel N bit streams having a timing rate of $f_2/N$. Note that the blanking interval is present. Since the N flip-flops 138, 139, and 140 are inhibited during the blanking interval, the framing bits have been removed at the 145, 146, and 147 paths. A clock signal having a continuous bit rate of $f_1$ is generated from the timing signal $f_1'$ at 135 by a standard clock recovery circuit 144. This clock signal enables the N D-type flip-flops 141, 142, and 143 to retime the N bit streams to provide NRZ parallel outputs having a continuous repetition rate of $f_1$ (i.e., no gaps). The use of flip-flops 116 and 117 as described is completely arbitrary since the user of the multiplex system may prefer to use the digital output signals as they occur at paths 113 and 114.

In regard to FIG. 7, certainly there are other framing formats which could be used to produce the desired stuffing ratio, $S_R$. More complicated patterns could be used at some expense in the complexity of generators 24 or 74. It might be desirable, from a performance viewpoint, to be able to add more than one framing bit consecutively (i.e., $k > 1$). Multiple framing bits would decrease the reframe time significantly. The maximum number of bits that may be stuffed in succession without the introduction of significant distortion is equal to N, the number of digital sources. However, the maximum number of consecutively stuffed bits should probably be limited to N-1 or less, and the stuffing ratio to a value of one or greater. These particular considerations are limited by the system design and the objectives which are considered important.

The invention has been described only with respect to certain specific embodiments. It is to be understood that various modifications can be devised by those skilled in the art without departing from the spirit and scope of the invention. By way of example and not limitation, the D-type flip-flops shown in FIGS. 4 and 5 could be replaced with other devices which performed an equivalent function. Another modification would be to replace the delay circuits in the signal paths (17 in FIG. 1 and 59, 60, and 61 in FIG. 2) with flip-flops or sampling circuits to provide the proper outputs at the proper timed sequence. Certainly, other modifications could be made without departing from the spirit and scope of the invention.

What is claimed is:

1. A digital time-division multiplexer for multiplexing the output signals from N digital sources to form a composite line signal having a bit rate of $f_2$, said multiplexer comprising:
   timing means providing a binary clock signal $f_2$;
   means responsive to said timing means for generating a binary clock signal $f_1'$ having periodic gaps of a duration of at least $1/f_2$ and being inserted in said $f_1'$ clock signal at a fixed rate such that $Nf_1/(f_2 - Nf_1)$ is a constant; said $f_1'$ clock signal having an average bit rate of $f_1$, having a bit rate of $f_2/N$ between periodic gaps and $f_2 > Nf_1$;
   means for interconnecting said N digital sources and said generating means to provide clock timing for each of said N digital sources so that each of said N output signals is at the $f_1'$ rate; and
   means for interleaving said N synchronous output signals from said digital sources to form said composite line signal.

2. A digital time-division multiplexer for multiplexing the output signals from N digital sources to form a composite line signal having a predetermined framing pattern and a bit rate of $f_2$, said multiplexer comprising:
   timing means providing a binary clock signal $f_2$;
   means responsive to said timing means for generating a binary clock signal $f_1'$ having periodic gaps of a duration of at least $1/f_2$ and being inserted in said $f_1'$ clock signal at a fixed rate such that $Nf_1/(f_2 - Nf_1)$ is a constant; said $f_1'$ clock signal having an average bit rate of $f_1$, a bit rate of $f_2/N$ between periodic gaps, and $f_2 > Nf_1$;
   means for interconnecting said N digital sources and said generating means to provide clock timing for each of said N digital sources so that each of said N output signals is at the $f_1'$ rate;
   means for generating control information pulses;
   means for interleaving said N output signals from said digital sources to form said composite line signal having said periodic gaps; and
   means for inserting said control information pulses in selected ones of said periodic gaps.

3. A digital time-division multiplexer for multiplexing the output bit stream from first and second digital sources to form a composite line signal having a bit rate of $f_2$, said multiplexer comprising:
   timing means providing a binary clock signal $f_2$;
   means responsive to said timing means for generating a binary clock signal $f_1'$ having periodic gaps of a duration of at least $1/f_2$ and being inserted in said $f_1'$ clock signal at a fixed rate such that $2f_1/(f_2 - 2f_1)$ is a constant; said $f_1'$ clock signal having an average bit rate of $f_1$, having a bit rate of $f_2/2$ between periodic gaps and $f_2 > 2f_1$;
   means for interconnecting said N digital sources and said generating means to provide clock timing for each of said N digital sources so that each of said N output signals is at the $f_1'$ rate; and
   means for interleaving said bit streams from said first and second digital sources to form said composite line signal.

4. The multiplexer in accordance with claim 3 wherein said binary clock means further comprises:
   means for sequentially counting predetermined numbers of bits from said timing means and generating a binary blanking signal $f_b$ when each predetermined number of bits is counted, said binary signal $f_b$ having a duration the same as said periodic gap;
   logic means combining said binary signals $f_2$ and $f_b$ which is the logic AND summation of $f_2$ and $\overline{f_b}$; and
   digital dividing means generating said $f_1'$ clock signal from said binary signal $(f_2 \cdot \overline{f_b})$.

5. The multiplexer in accordance with claim 4 further comprising (N-1) delay circuits synchronizing said signals from said N digital sources so that said periodic gaps in each bit stream occur at the same point in time when interleaved in said composite line signal.

6. The multiplexer of claim 5 in combination with a digital transmission facility.

7. A combination as in claim 6 further including means for demultiplexing said composite line signal forming N parallel digital bit streams.

8. A digital time-division multiplexer for multiplexing the output bit stream from first and second digital sources to form a composite line signal having a bit rate of $f_2$, said multiplexer comprising:
   timing means providing a binary clock signal $f_2$;
   means responsive to said timing means for generating a binary clock signal $f_1'$ having periodic gaps of a duration of at least $1/f_2$ and being inserted in said $f_1'$ clock signal at a fixed rate such that $2f_1/(f_2 - 2f_1)$ is a constant; said $f_1'$ clock signal having an average bit rate of $f_1$, having a bit rate $f_2/2$ between periodic gaps and $f_2 > 2f_1$; said generating means providing clock timing for each of the two said digital sources so that each said bit stream is at the $f_1'$ rate;
   means for interleaving said bit streams from said first and second digital sources to form said composite line signal.

9. The multiplexer in accordance with claim 8 wherein said binary clock means further comprises:
   means for sequentially counting predetermined numbers of bits from said timing means and generating a binary blanking signal $f_b$ when a predetermined number of bits is counted, said binary signal $f_b$ having a duration the same as said periodic gap;
   logic means combining said binary signals $f_2$ and $f_b$, which is the logic AND summation of $f_2$ and $\overline{f_b}$; and
   digital dividing means generating said $f_1'$ clock signal from said binary signal $f_2 + \overline{f_b}$.

10. The multiplexer in accordance with claim 9 wherein said interleaving means further comprises:
    delay means producing a time delay of $1/f_2$ in the bit stream from said first digital source; and an OR-gate interleaving said delayed bit stream with said bit stream from said second digital source.

11. The multiplexer in accordance with claim 10 further comprising:
means for generating framing bits; and
means for inserting said framing bits in selected ones of said gaps in said composite line signal.

12. The multiplexer of claim 11 in combination with a digital transmission facility.

13. A combination as in claim 12 including means for demultiplexing said composite line signal forming two parallel digital bit streams.

* * * * *

UNITED STATES PATENT AND TRADEMARK OFFICE
CERTIFICATE OF CORRECTION

PATENT NO. : 3,995,120
DATED : November 30, 1976
INVENTOR(S) : Alvin L. Pachynski, Jr.

It is certified that error appears in the above-identified patent and that said Letters Patent are hereby corrected as shown below:

Column 4, line 37, after period, "using" should read -- Using --

Column 9, claim 1, line 32, "Nf$_1$" should read -- Nf$_1$ --.

Column 9, claim 2, line 51, "Nf$_1$" should read -- Nf$_1$ --.

Column 10, claim 4, first line of the claim, delete "3" and insert -- 2 --.

Signed and Sealed this

Seventeenth Day of May 1977

[SEAL]

Attest:

RUTH C. MASON
*Attesting Officer*

C. MARSHALL DANN
*Commissioner of Patents and Trademarks*